United States Patent
Delvigne et al.

(10) Patent No.: US 7,291,836 B2
(45) Date of Patent: Nov. 6, 2007

(54) METHOD AND DEVICE FOR CONTINUOUS DETERMINATION OF LUBRICATING OIL CONSUMPTION OF AN INTERNAL COMBUSTION ENGINE

(75) Inventors: Thierry Delvigne, Froyennes (BE); Jerome Obiols, Lyons (FR)

(73) Assignees: Totalfinaelf France, Puteaux (FR); Delta Services Industriels Sprl, Froyennes (BE)

(*) Notice: Subject to any disclaimer, the term of this patent is extended or adjusted under 35 U.S.C. 154(b) by 305 days.

(21) Appl. No.: 10/526,973

(22) PCT Filed: Sep. 5, 2003

(86) PCT No.: PCT/FR03/02657

§ 371 (c)(1),
(2), (4) Date: Mar. 7, 2005

(87) PCT Pub. No.: WO2004/023084

PCT Pub. Date: Mar. 18, 2004

(65) Prior Publication Data

US 2005/0268692 A1  Dec. 8, 2005

(30) Foreign Application Priority Data

Sep. 6, 2002 (FR) .................. 02 11050

(51) Int. Cl.
*G01N 7/00* (2006.01)
*G01N 33/497* (2006.01)
*G06G 7/70* (2006.01)

(52) U.S. Cl. ............ 250/303; 250/302; 250/343; 250/356.2; 436/56; 436/57; 73/23.31

(58) Field of Classification Search ......... 73/23.31; 250/356.2, 303; 436/57
See application file for complete search history.

(56) References Cited

U.S. PATENT DOCUMENTS 2,833,261 A * 5/1958 August .................. 123/556

(Continued)

FOREIGN PATENT DOCUMENTS

FR  2 307 257 A  11/1976

(Continued)

OTHER PUBLICATIONS

Fireman et al., "Stable Bromine and Activation Analysis in Protein Tracer Studies", Nature 210, 547-548 (1966).*
"Ionizing radiation", The Free Dictionary <http://www.thefreedictionary.com/ionizing+radiation>.*

(Continued)

*Primary Examiner*—Robert Kim
*Assistant Examiner*—Bernard Souw
(74) *Attorney, Agent, or Firm*—Sughrue Mion, PLLC

(57) ABSTRACT

The invention relates to a method and device for the continuous determination of the lubricating oil consumption of an internal combustion engine. The inventive method consists in: placing a determined quantity of at least one radioactive tracer in the lubricating oil of which the consumption is to be measured; and measuring the quantity of radioactive tracer(s) present in the gases released from the engine (2), said measurement being taken downstream of the engine. According to the invention, the quantity of radioactive tracer(s) of the lubricating oil present in the gases released from the engine (2) is measured as follows: the gases are brought into contact with a trap (7) which can physically trap the radioactive tracer particles, the radiation from the trap is measured using a detector (10) which is sensitive to radiation emitted by the trapped radioactive tracer(s) and the measurements taken by the detector (10) are sent to a programmed computer which can convert said measurements into the lubricating oil consumption rate of the engine.

15 Claims, 4 Drawing Sheets

U.S. PATENT DOCUMENTS

| | | | |
|---|---|---|---|
| 2,939,011 A | 5/1960 | Bisso et al. | |
| 2,957,986 A | 10/1960 | Quigg | |
| 3,471,696 A | 10/1969 | Moore et al. | |
| 3,657,541 A * | 4/1972 | Deutsch et al. | 250/252.1 |
| 4,048,497 A * | 9/1977 | Fritzsche | 250/303 |
| 4,990,780 A * | 2/1991 | Lee et al. | 250/343 |
| 5,445,964 A * | 8/1995 | Lee et al. | 436/60 |
| 6,294,389 B1 * | 9/2001 | Vitale et al. | 436/57 |
| 2005/0268692 A1 * | 12/2005 | Delvigne et al. | 73/23.31 |
| 2006/0237640 A1 * | 10/2006 | Delvigne et al. | 250/288 |
| 2007/0150161 A1 * | 6/2007 | Dequenne | 701/101 |

FOREIGN PATENT DOCUMENTS

GB  2 051 354 A  1/1981

OTHER PUBLICATIONS

"Neutron Activation Analysis", Wikipedia <http://en.wikipedia.org/wiki/Neutron_activation_analysis>.*

Michael D. Glascock "An Overview of Neutron Activation Analysis", University of Missouri-Columbia, Research reactor center, <http://web.missouri.edu/~glascockm/naa_over.htm>.*

* cited by examiner

METHOD AND DEVICE FOR CONTINUOUS DETERMINATION OF LUBRICATING OIL CONSUMPTION OF AN INTERNAL COMBUSTION ENGINE

The present invention relates to a method and a device for the continuous determination of the lubricating oil consumption of an internal combustion engine. This method uses a radiotracer which is incorporated into the oil and the quantity of which measured in the exhaust gases is proportional to the engine oil consumption The importance of precisely knowing the lubricating oil consumption of vehicle engines is known, both for automobile manufacturers and for lubricating oil and/or additive producers, whether to prevent premature wear of the parts of the engine or to make the latter operate under the best lubrication conditions.

To date, various methods have been proposed for measuring the lubricating oil consumption of internal combustion engines, but all of them have the drawback of being discontinuous.

They furthermore have various disadvantages depending on their nature, for example that of requiring a very large measuring instrument in the case of using a radioactive bromine tracer, of leading to unreliable results due to damage by the tracer itself in the case of using sulfur or zinc tracers, or even of having to carry out the measurements in a laboratory fitted with special safety equipment if tritium is used as the tracer.

Because of these drawbacks, it has accordingly been suggested to label the oils with a radioactive tracer and to measure the quantity of this tracer present in the exhaust gases, by bubbling them through an aqueous solution of nitric acid and silver nitrate (see "A Method of Measuring Oil Consumption by Labelling with Radioactive Bromine", H. Zellbeck, M. Bergmann, J. Röthig, J. Seibold and A. Zeuner, Tribotest Journal 6-3, March 2000).

It has also been proposed to incorporate a bromine-based radioactive tracer into the oil, for example 1,2-dibromooctadecane, and to measure the level of this compound in the exhaust gases by using a basic solution, for example sodium hydroxide (U.S. Pat. No. 3,471,696).

The drawback of these methods is that they involve operations of fitting and removing the analysis device, and that the measurements taken are spread over a fairly long time.

A need is therefore felt in the art to provide a method and a device which allow continuous measurement of the lubricating oil consumption by an internal combustion engine, without having to fit or remove special devices, which can be implemented easily with the aid of simple, tried and tested instruments and which in no way affect the properties of the oil in question.

In its principle, for this purpose, the invention consists in using the presence in the lubricating oil of a radioactive tracer incorporated into it, in order to measure the radioactivity of the combustion gases downstream of the engine with the aid of a probe sensitive to ionizing radiation, and in deducing therefrom the lubricating oil consumption of the engine.

The invention therefore firstly relates to a method for continuous determination of the lubricating oil consumption of an internal combustion engine, in which:

the lubricating oil whose consumption is to be measured is labeled with a determined quantity of at least one radioactive tracer;

downstream of the engine, the quantity of radioactive tracer(s) present in the gases emerging from the latter is measured;

and the lubricating oil consumption of the engine is deduced therefrom;

this method being one wherein the measurement of the quantity of radioactive lubricating oil tracer(s) present in the gases emerging from the engine comprises:

bringing these gases in contact with a trap which can physically retain the radioactive tracer particles;

with the aid of a detector sensitive to radiation emitted by the radioactive tracer(s) retained by the trap, measuring this radiation coming from the trap;

and transmitting the measurements taken by this detector to a programmed computer which can convert these measurements into the lubricating oil consumption rate of the engine.

The nature of the radioactive tracer, which is selected so that its radiation can be measured, may vary widely and it is selected from among species $E_i$ which are activatable and/or species $E_{ii}$ which are intrinsically radioactive.

It will be noted that the required quantity of radioactive tracer contained in the lubricating oil will depend in particular on the nature of the tracer (activity, radiation type and energy), the positioning of the detector with respect to the trap, the geometry of the detector and of the trap, and any shielding which there may be.

Depending on the situation, the species $E_i$ are activated either before their incorporation into the engine oil or when they are inside the engine oil. This activation is performed using neutrons by irradiation carried out with a neutron source, or it is performed using a proton beam by means of a particle accelerator, under suitable conditions known to the person skilled in the art.

One of the possible options for the activation is to incorporate the species $E_i$ into a suitable quantity of a carrier (for example solvents and/or diluents such as a diluting oil) then subjecting the mixture which is obtained to the appropriate activation, and finally adding it to the engine oil.

These species $E_i$ suitable for being labeled include the following elements, in particular: zinc, bromine, sodium, molybdenum, phosphorus, sulfur, copper, calcium and magnesium, and compounds comprising these elements.

Examples which may be mentioned for compounds of species $E_i$ that may be used are the conventional lubricant additive families: zinc dithiophosphate, calcium sulfonates, magnesium sulfonates, calcium phenates, magnesium phenates, calcium salicylates, magnesium salicylates, etc.

It is also possible to use other species $E_i$ which do not affect the working properties of the oil and whose quantity collected at the exhaust gas outlet remains correlated with the engine oil consumption.

Examples which may be mentioned for the species $E_{ii}$ are the isotopes of halogens such as, for example, bromine-82, technetium 99-m, strontium-85, germanium-68, germanium-69 and cobalt-56.

As in the case of the species $E_i$, naturally radioactive elements may be used on their own or in the form of compounds containing said elements, and they may optionally be incorporated into a carrier (for example solvents and/or diluents, such as a diluting oil). For example, technetium 99-m be incorporated into the oil in the form of an aqueous solution of sodium pertechnate $NaTcO_4$.

It is also possible to use technetium 99-m packaged in the form of particles which have nanometric dimensions and are isolated from the atmosphere by carbon; in this context, the product marketed under the brand Technégaz gas may be mentioned (this product is conventionally used for the clinical study of lung ventilation).

Regarding the use of germanium-68 and germanium-69, at least one tetraalkyl germane containing at least one of these two isotopes may also be added to the oil. Since the alkyl chain length of these tetraalkyl germanes is proportional to their boiling point, it is advantageous to use a mixture of tetraalkyl germanes whose boiling points are representative of the distillation fraction of the lubricant in question. For example, tetrahexyl germane, tetraheptyl germane and tetraoctyl germane have comparable boiling points to a conventional engine oil.

In order to simplify the elimination of the radioactive tracers retained by the trap, it is preferable to use radioactive elements with a short half-life such as bromine 82, technetium 99-m, germanium-69 etc. Technetium 99-m is particularly preferred because of its very short half-life (6 hours) and the very rapid disappearance of its radioactivity, at the end of about 3 days.

The type of the trap capable of physically retaining the radiotracer of the lubricating oil may vary. In general, the trap includes at least one filtration element consisting of a filtering medium with a porous structure, fixed in metal canning which is connected to the exhaust gas line. The filtering medium, or the filtering elements arranged in the metal canning of the filter, may consist of porous ceramic elements. The exhaust gases pass through the filtering medium between an inlet end and an outlet end of the filter, which makes it possible to retain the particles of radioactive lubricant tracer(s) contained in the exhaust gases.

In the scope of the invention, it will be advantageous to employ the particle filters which automobile manufacturers use in order to eliminate the organic compounds and carbon contained in exhaust gases.

It will be noted that the detector for radioactive tracer(s) retained by the trap may advantageously be arranged in immediate proximity to the latter, which significantly facilitates the measurements.

This detector is a probe for detection of ionizing radiation (beta, X or gamma rays) which may either be of the liquid or solid scintillator type [sodium iodide crystal NaI(Tl), BGO crystal] or of the semiconductor type [germanium crystal, CZT crystal].

These types of detectors allow the method according to the invention to be carrier continuously, and the data acquisition can be performed in a very short time of the order of one second.

It will furthermore be noted that the detector can simultaneously detect the presence of different labeled oil tracers and their respective quantities in the exhaust gases.

The detected signals are then processed by a series of means for calculating the lubricating oil consumption of the engine; these means comprise, in particular, a means for processing the detected signals (for example, amplifier, filter and analog/digital converter ADC), a means for analyzing the pulse amplitudes (for example, multichannel analyzer) and a means for storing and processing the acquired data (for example, PC computer).

The invention also relates to a device for the continuous determination of the lubricating oil consumption of an internal combustion engine, this device comprising:
a means for incorporating a determined quantity of at least one radioactive tracer into the lubricating oil;
means for measuring downstream of the engine, in the combustion gases emerging from the latter, the quantity of the radioactive tracer which is present therein;
and means for deducing the lubricating oil consumption of the engine from this measurement;

this device being one which comprises:

(i) downstream of the engine, a trap with which the combustion gases emerging from the engine come in contact and which can physically retain the radioactive tracer particles present in these gases;

(ii) in proximity to this trap and at a distance therefrom allowing radiation emitted by the radioactive tracer particles retained by this trap to be measured, a detector sensitive to this radiation;

(iii) functionally linked to the detector, a programmed computer which can calculate the lubricating oil or additive consumption of the engine on the basis of the information recorded by the detector.

The trap capable of retaining of the radioactive tracer particles of the labeled oil may be placed at any position downstream of the engine allowing it to be in contact with the combustion gases. For instance, it may be located on the combustion gas exhaust line of the engine or on a branch line intended for this purpose.

Before the exhaust gases are discharged to the atmosphere, if the particle trap is not itself a particle filter, such a filter will necessarily need to be provided on the exhaust line downstream of this trap.

The appended drawings illustrate the embodiment of the invention. In these drawings.

Figure 1:
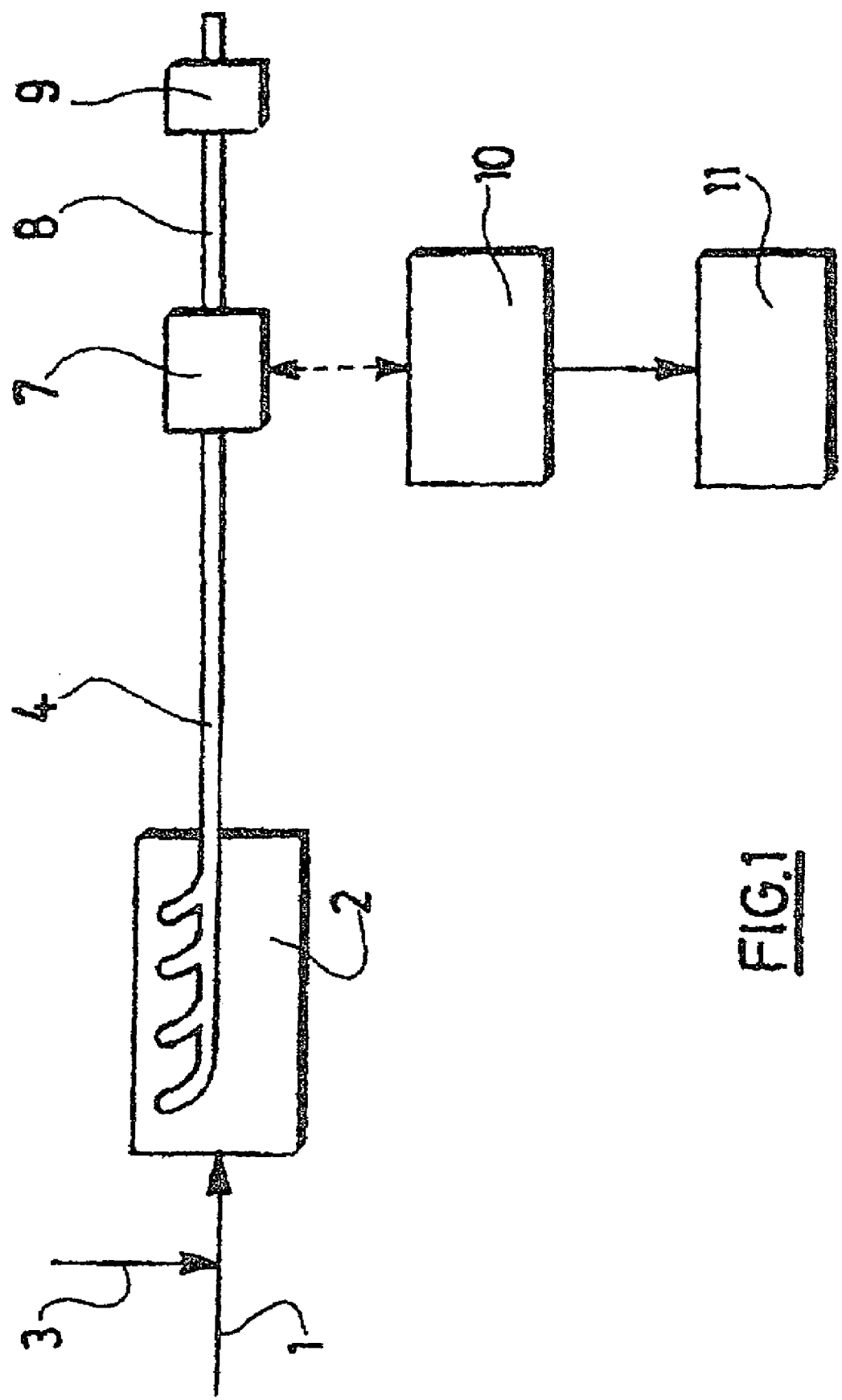
FIG. 1 is a schematic view illustrating the method of the invention.

Reference will first be made to FIG. 1.

Branching off from the lubricating oil circuit 1 of the internal combustion engine 2, a line 3 is provided for introducing a predetermined quantity of the same lubricating oil, supplemented with at least one radioactive tracer for measuring the oil consumption of the engine.

The combustion products of the engine 2 are discharged through the line 4 to a trap 7, which can physically retain the particles of the radiochemical tracer or radioactived additive present in the exhaust gases.

Before being discharged to the Outside through the line 8, these gases pass through the filter 9 intended to retain the last radioactive particles which are present.

In immediate proximity to the trap 7, a probe 10 for detection of ionizing radiation is provided which makes it possible to continuously measure the quantity, present in the trap 7, of the radiotracer incorporated into the lubricating oil or the element(s) labeled by activation of additives contained in this oil.

It will be noted that the thermal neutron and/or proton beam activation of the species Ei in no way affects the quality of the lubricating oil, because thermal neutrons are particles with a very low energy.

As explained above, it is preferable to use a radioactive compound with a short half-life as the radiotracer of the lubricating oil, in particular technetium 99m.

The following examples, which do not imply any limitation, illustrate the embodiment of the invention and its advantages.

EXAMPLES

These examples are intended to illustrate measurement of the consumption by a four-stroke heat engine of a lubricating oil labeled with the aid of a radioactive tracer, which is trapped by a particle filter placed on the exhaust circuit of the engine.

The four-stroke engine used for Examples 1 and 2 is a 600 cm³ HONDA motorcycle engine, known by the commercial name HORNET.

The engine used in Example 3 is a 2.2 l turbo-diesel engine fitted to a Renault Laguna vehicle.

The four-stroke engine oil used in Examples 1 and 3 is a motorcycle oil marketed under the brand ELF, type 4 DXRatio. The oil used in Example 3 is an automobile engine oil marketed under the ELF brand Prestigrade 15W40.

The following two tracers were used:
the isotope $^{99M}Tc$, available in the form of sodium pertechnate $NaTcO_4$ in aqueous solution,
and the radioactive isotope $^{65}Zn$, obtained by irradiation of a known additive conventionally used for a lubricating oil, namely a secondary zinc dithiophosphate (denoted DTPZn) containing a large quantity of zinc (more than 10% by weight), which is subjected to irradiation for several hours under a high neutron flux from a nuclear reactor, so as to convert the stable $^{64}Zn$ into radioactive $^{65}Zn$.

The radioactive particle trap used is a particle filter available in the trade, installed on Peugeot vehicles fitted with the 2.2 liter HDI engine.

The system for detecting the radioactive particles retained by the trap is a standard NaI(Tl) detector measuring 3*3 inches with an integrated photomultiplier tube, the other elements of the measurement system being a model 2007P charge preamplifier of the Canberra brand, a 2020 spectroscopy amplifier (Canberra), a model 8087 ADC converter (Canberra), a model S100 multichannel card (Canberra). The software employed during these trials are "Génie 2000" (Canberra) for the gamma spectrometry and the MCS (Multi Channel Scaling) analysis software "IDSWear" marketed by Atlantic Nuclear Services (ANS), Canada.

Example 1

This example relates to measuring the oil consumption by using $^{99M}Tc$ as a tracer.

The aqueous solution of sodium pertechnate is miscible in a small quantity (2 to 3% by weight, depending on the type of oil) with the four-stroke engine oil.

The starting material is an aqueous solution of $NaTcO_4$ having a specific activity of 500 MBq/ml (megabecquerels per milliliter).

2.2 ml of this solution are taken and mixed with 3 liters of four-stroke engine oil, in order to obtain a specific activity of 370 MBq/l.

The oil labeled in this way is introduced into the oilpan of the engine (uncontaminated engine fueled with unlabeled gasoline), the engine is started and operated at different speeds.

Figure 2:
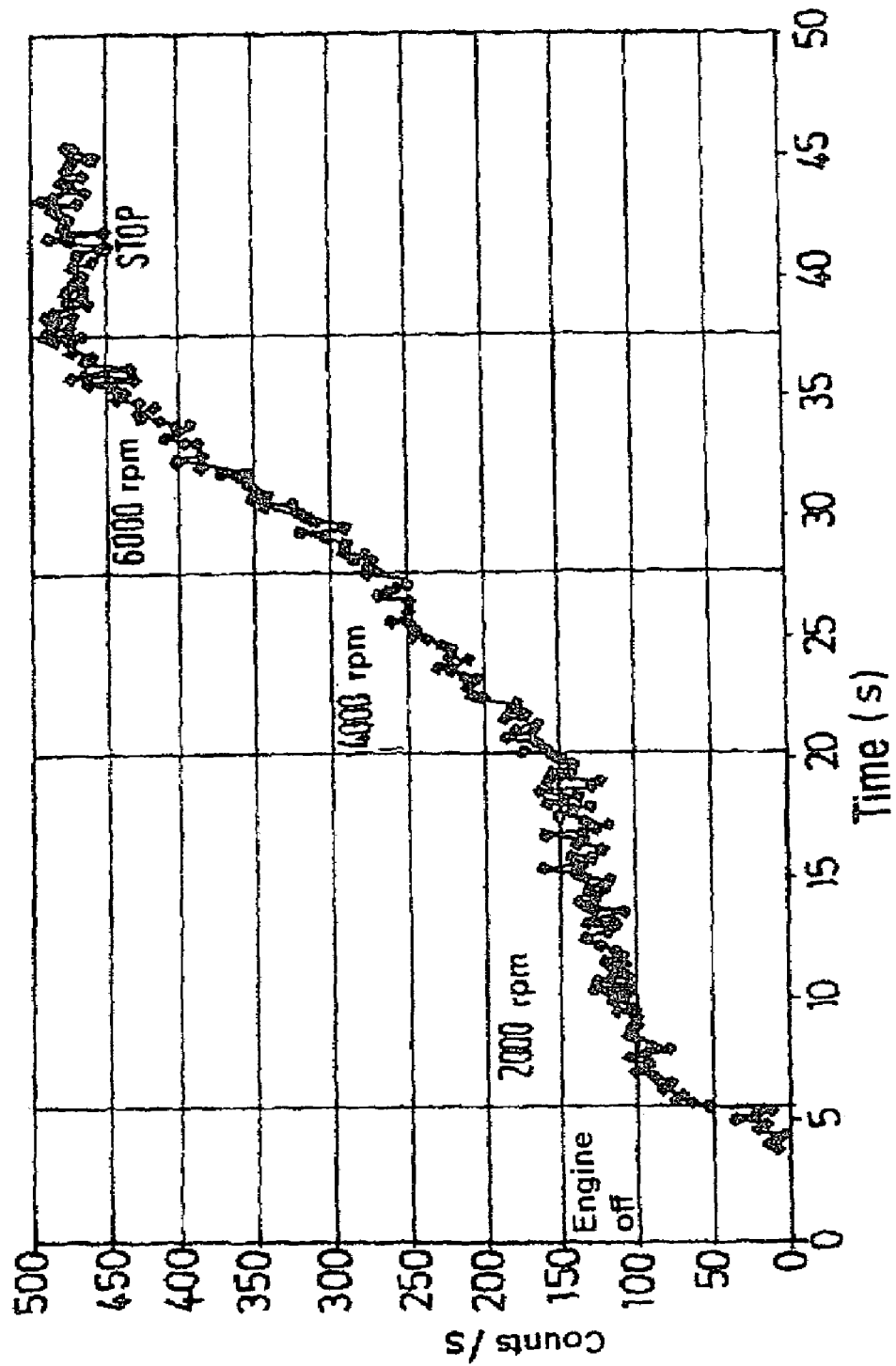
FIGS. 2 to 4 are diagrams relating to exemplary embodiments which will be described below.

FIG. 2 is a diagram illustrating the number of gamma rays detected per second at the particle filter as a function of time, at different engine speeds.

The increase in activity detected as a function of time and the different engine speeds (2000, 4000 and 6000 rpm) corresponds to the oil consumption.

This consumption is low with this type of engine and is very difficult to assess by conventional measuring methods, while the method according to the invention is entirely suitable for such measurements. Furthermore, the method allows the oil consumption to be monitored continuously.

It can be seen in FIG. 2 that the slope of the curve which reflects the oil consumption increases with the speed, according to a substantially linear relation in this range of speeds. Specifically, this slope is as follows as a function of the engine speed:

| rpm | Slope (counts/s) | Consumption |
|---|---|---|
| 2000 | 1.10 | 10.7 ml/h |
| 4000 | 2.67 | 25.9 ml/h |
| 6000 | 4.10 | 39.9 ml/h |

Taking the detection geometry and the efficiency of the counting system into account makes it possible to estimate the consumptions indicated in the right-hand column for each speed of the engine.

Example 2

This example relates to the consumption of oil labeled with $^{65}Zn$.

Starting with a sample of DTPZn activated by neutron irradiation, the specific activity of which is 95 kBq/ml, 30 ml are taken and mixed with 3 liters of four-stroke engine oil in order to obtain a specific activity of 950 kBq/l.

The oil labeled in this way is introduced into the oilpan of the engine. Given the low specific activity of the tracer which is available, the configuration of the engine was modified for this trial so as to obtain a high oil consumption, close to 1 liter per hour at 6000 rpm.

The uncontaminated engine, fuelled with unactivated gasoline, is started and operated at the stabilized speed of 6000 rpm.

In view of the long half-life of $^{65}Zn$ (244 days), a single series of measurements was carried out in this trial in order to avoid over-contaminating the measuring equipment as a whole (test bench and particle filter), the aim being simply to test the method according to the invention on an engine whose oil consumption is much higher than in Example 1, and furthermore with an isotope other than $^{99M}Tc$.

Figure 3:
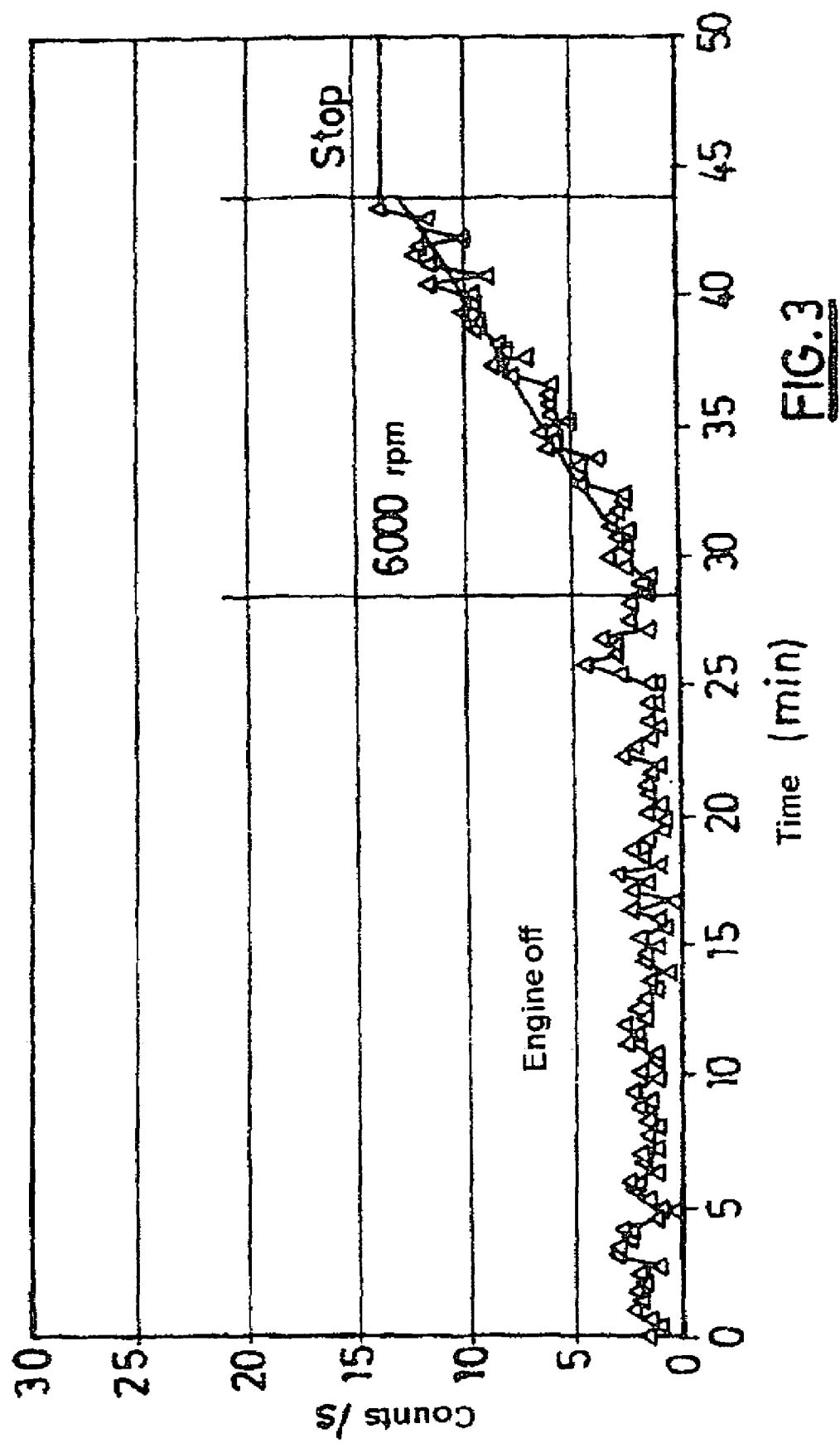

FIG. 3 is a diagram illustrating the number of gamma rays detected per second at the particle filter as a function of time at 6000 rpm.

It can be seen that the slope of the curve is about 0.73 count/s. Taking into account the detection geometry and the efficiency of the counting system for the radiation emitted by $^{65}Zn$ (this radiation has a much higher energy than $^{99M}Tc$) makes it possible to estimate the consumption of the engine at 0.87 liter per hour.

Examples 1 and 2 thus demonstrate a relation between the running speeds of the engine and the rise in activity of the particle filter, which are consistent with the oil consumption to be expected under these conditions.

The use of an isotope does not perturb the measurements, and similar behaviors are observed with two different isotopes.

Example 3

This example relates to the consumption of oil labeled with $^{65}Zn$.

Starting with a sample of DTPZn activated by neutron irradiation, the specific activity of which is 95 kBq/ml, 50 liters of oil having a specific activity of 21.2 kBq/l are prepared.

The oil labeled in this way is introduced into the oilpan of the engine. The vehicle, installed on a rolling rig, executes pre-programmed cycles of 471 km selected so as to promote the oil consumption by the engine.

The engine used is uncontaminated and fuelled with unactivated gasoline. Six drains were carried out after 10,000 km, and one drain was carried out after 20,000 km. At each drain, the oil consumption of the engine is calculated by taking the difference between the initial mass of oil and the drained mass of oil, collected by weighing, to which is added the mass of any oil top-ups carried out between each drain. The increase in the Zn-65 activity of the particle filter between each drain is also measured.

Figure 4:
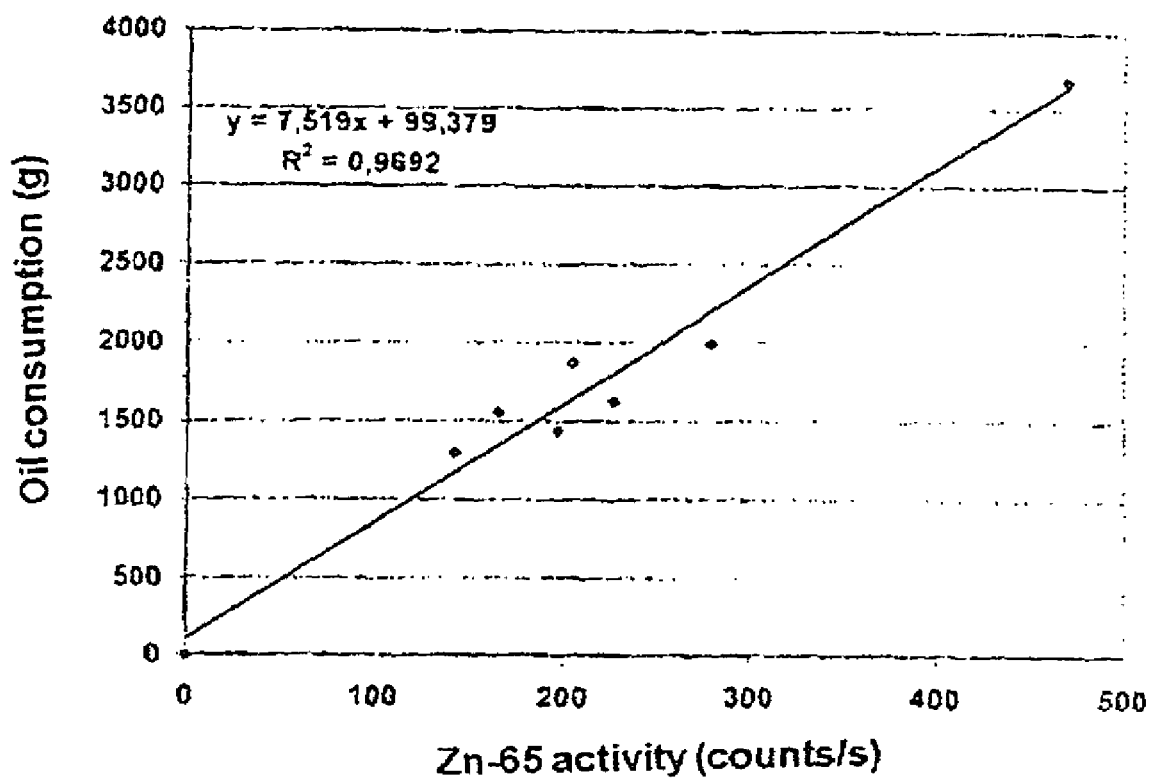

FIG. 4 shows the correlation between the oil consumption of the engine at each drain, calculated by weighing, and the increase in activity at the particle filter.

This example therefore shows that monitoring the accumulation of Zn-65, used in the form of activated DTPZn, at the particle filter is representative of the oil consumption of the engine.

Since it is possible to measure the activity at the particle filter continuously, it is also possible to continuously measure the oil consumption of the engine by using this device and this method.

The invention claimed is:

1. A method for determination of the lubricating oil consumption of an internal combustion engine, in which:
   the lubricating oil whose consumption is to be measured is labeled with a determined quantity of at least one radioactive tracer;
   downstream of the engine, the quantity of radioactive tracer(s) present in the gases emerging from the engine is measured; and
   the lubricating oil consumption of the engine is deduced therefrom;
   said method being one wherein the measurement of the quantity of radioactive lubricating oil tracer(s) present in the gases emerging from the engine comprises:
   bringing said gases in contact with a trap which can physically retain the radioactive tracer particles;
   with the aid of a detector sensitive to radiation emitted by the radioactive tracer(s) retained by the trap and placed at a distance therefrom allowing the emitted radiation to be measured, continuously, and while the engine is in use, measuring said radiation coming from the trap; and
   transmitting the measurements taken by said detector to a programmed computer which can convert said measurements into the lubricating oil consumption rate of the engine.

2. The method as claimed in claim 1, wherein the trap includes at least one filtration element formed by at least one filtering medium with a porous structure, fixed in metal canning.

3. The method as claimed in claim 1 or 2, wherein the radioactive tracer incorporated into the lubricating oil is a radioactive element with a short half-life.

4. The method as claimed in claim 3, wherein the radioactive tracer incorporated into the lubricating oil is technetium 99m, and said technetium 99m is incorporated into the oil in the form of an aqueous solution of sodium pertechnate $NaTcO_4$.

5. The method as claimed in claim 3, wherein the radioactive tracer incorporated into the lubricating oil is technetium 99m, and said technetium 99m is incorporated into the oil in the form of particles which have nanometric dimensions and are isolated from the atmosphere by carbon.

6. The method as claimed in claim 1, wherein the radioactive tracer incorporated into the lubricating oil comprises at least one element selected from the group consisting of germanium-68 and/germanium-69.

7. The method as claimed in claim 1, wherein the radioactive tracer comprises an element, or a compound comprising said element, which has been at least one of neutron activated and activated by a proton beam before incorporation into said oil.

8. A device for the continuous determination of the lubricating oil consumption of an internal combustion engine, device comprising:
   means for incorporating a determined quantity of at least one radioactive tracer into the lubricating oil;
   means for measuring downstream of the engine, in the combustion gases emerging from the engine, the quantity of the radioactive tracer which is present therein; and
   means for deducing the lubricating oil consumption of the engine from said measurement;
   said device being one which comprises:
   (i) downstream of the engine, a trap with which the combustion gases emerging from the engine come in contact and which can physically retain the radioactive tracer particles present in said gases;
   (ii) in proximity to said trap and at a distance therefrom allowing radiation emitted by the radioactive tracer particles retained by said trap to be measured continuously and while the engine is in use, a detector sensitive to said radiation;
   (iii) functionally linked to the detector, a programmed computer which can calculate the lubricating oil or additive consumption of the engine on the basis of the information recorded by the detector.

9. The device as claimed in claim 8, wherein the trap includes at least one filtration element formed by at least one filtering medium with a porous structure, fixed in metal canning.

10. The device as claimed in claim 8 or 9, wherein the trap is placed on the combustion gas exhaust line of the engine, or on a branch line intended for exhausting combustion gas from the engine.

11. The device as claimed in claim 8, wherein the trap comprises a particle filter.

12. The device as claimed in claim 8, wherein the detector is a probe for detection of ionizing radiation.

13. The device as claimed in claim 8, further comprising a filter arranged on the combustion gas exhaust line, between the trap and the point where said gases are discharged to the atmosphere.

14. The method as claimed in claim 3, wherein the radioactive tracer incorporated into the lubricating oil comprises bromine 82 or technetium 99m.

15. The method as claimed in claim 6, wherein the radioactive tracer incorporated into the lubricating oil comprises at least one tetraalkyl gennane containing at least one of germanium-68 and germanium-69.

* * * * *